United States Patent [19]
Hettinga et al.

[11] Patent Number: 5,898,591
[45] Date of Patent: Apr. 27, 1999

[54] ARTICLE OF MANUFACTURE HAVING COMPUTER READABLE PROGRAM CODE FOR MOLDING AN ARTICLE AND METHOD OF MOLDING AN ARTICLE BY PROVIDING COMPUTER READABLE PROGRAM CODE

[76] Inventors: Siebolt Hettinga, 2123 NW. 111th St., Des Moines, Iowa 50325; Richard Osborne, 7040 NW 16th St., Ankeny, Iowa 50021

[21] Appl. No.: 08/695,422

[22] Filed: Aug. 12, 1996

[51] Int. Cl.[6] ................................................ G06F 19/00
[52] U.S. Cl. .............................. 364/475.09; 364/475.02; 425/162
[58] Field of Search .......................... 364/475.02–475.1; 425/144, 145, 147–150, 170, 171, 135, 140, 162, 169; 264/40.1–40.7

[56] References Cited

U.S. PATENT DOCUMENTS

| | | | |
|---|---|---|---|
| 4,674,053 | 6/1987 | Bannai et al. | 364/475.07 |
| 5,035,598 | 7/1991 | Fujita et al. | 425/144 |
| 5,062,784 | 11/1991 | Inaba et al. | 264/40.3 |
| 5,195,029 | 3/1993 | Murai et al. | 364/475.05 |
| 5,275,768 | 1/1994 | Inaba et al. | 364/475.05 |
| 5,296,179 | 3/1994 | Kamiguchi et al. | 364/475.08 |
| 5,350,547 | 9/1994 | Yamaguchi et al. | 364/475.09 |
| 5,470,218 | 11/1995 | Hillman et al. | 425/144 |
| 5,518,671 | 5/1996 | Takizawa et al. | 264/40.1 |

FOREIGN PATENT DOCUMENTS

| | | | |
|---|---|---|---|
| 0 363 498 A1 | 4/1990 | European Pat. Off. | B29C 45/76 |
| 0 368 300 A2 | 5/1990 | European Pat. Off. | B29C 45/76 |
| 0 377 736 A1 | 7/1990 | European Pat. Off. | G05B 23/02 |
| 0 455 820 A1 | 11/1991 | European Pat. Off. | B29C 45/76 |
| 0 477 527 A1 | 4/1992 | European Pat. Off. | G05D 5/03 |

*Primary Examiner*—Paul P. Gordon
*Assistant Examiner*—Steven R. Garland
*Attorney, Agent, or Firm*—Brian J. Laurenzo; Michael C. Gilchrist

[57] ABSTRACT

An article of manufacture is provided where the article of manufacture comprises a computer usable medium having computer readable program code means therein. The computer readable program code means causes a computer to receive information, establish a molding profile based on the information, operate a molding machine to mold an article according to the molding profile, receive additional information corresponding to detected irregularities on the molded article, establish a modified molding profile based on the additional information received, and operate the molding machine to mold an additional article according to the modified molding profile. The additional information received by the computer which corresponds to detected irregularities on the molded article may be provided by a human operator, by a second computer, or by any other means.

31 Claims, 8 Drawing Sheets

ARTICLE OF MANUFACTURE HAVING COMPUTER READABLE PROGRAM CODE FOR MOLDING AN ARTICLE AND METHOD OF MOLDING AN ARTICLE BY PROVIDING COMPUTER READABLE PROGRAM CODE

BACKGROUND OF THE INVENTION

The present invention relates generally to computer programs and methods of molding an article, and more specifically to computer readable program code which causes a computer to establish a modified molding profile based on information which corresponds to detected irregularities on a molded article, and to a method of molding an article where the method includes providing computer readable program code which causes a computer to establish a modified molding profile based on information which corresponds to detected irregularities on the molded article.

Typically, within an automated molding process, a computer is communicatingly connected to a molding machine having a mold unit which has a male mold section and a female mold section. When the male mold section and the female mold section come together, they form a mold cavity in which a plastic material is injected in order to mold an article. A computer program is typically run on the computer, and the computer program allows a human operator to set certain molding profile parameters. The parameters influence whether an article is molded perfectly by the molding machine. Among the parameters which the human operator typically sets via the computer are: the amount of plastic material to be injected, a plasticize profile, a backpressure profile, an inject profile, a valve gating profile, a valve gating temperature, and a mold temperature. If these parameters are optimally set by the human operator, the molding machine will perfectly mold an article. If the parameters are not optimally set by the human operator, it is possible that the molding machine will mold an article which is irregular. Common irregularities on a molded article include "voids" (locations on the molded article where the injected plastic never reached) and "flashes" (locations on the molded article where injected plastic material seeped out of the mold cavity because the mold sections of the mold unit moved slightly away from each other during molding). Because it is undesirable to mold an article which has irregularities, it is important that the human operator optimally set the parameters. However, usually an article is not molded perfectly on the first attempt. Therefore, generally the human operator will examine the irregular article and decide how to modify the parameters on a subsequent attempt to mold the article. Because there are so many parameters to set, frequently the human operator will have to attempt molding the article many times before the article is molded perfectly. Presumably, the more experienced the human operator, the less attempts the human operator needs to mold an article perfectly. This is because an experienced human operator knows, after examining an irregular article, what adjustments to make to the parameters so that the article will be molded perfectly on the subsequent attempt. In contrast, a more inexperienced human operator will typically need more attempts to mold an article perfectly. Therefore, it has been costly to have an inexperienced human operator set the parameters when molding an article.

The difficulties discussed hereinabove are substantially eliminated by the present invention.

SUMMARY OF THE INVENTION

Accordingly, it is an object of the present invention to provide computer readable program code which allows an inexperienced human operator to mold an article perfectly.

Another object of the present invention is to provide computer readable program code which allows an article to be molded less expensively.

Still another object of the present invention is to provide a method of quickly and perfectly molding an article using computer readable program code.

Another object of the present invention is to provide a method so that an inexperienced human operator can mold a perfect article quickly and inexpensively.

By the present invention, it is proposed to overcome the difficulties encountered heretofore. To this end, an article of manufacture is provided where the article of manufacture comprises a computer usable medium having computer readable program code means therein. The computer readable program code means comprises: means for causing the computer to receive information; means for causing the computer to output electronic signals to the molding machine causing the molding machine to mold an article, where the electronic signals are dependent on the information received; means for causing the computer to receive additional information, where the additional information corresponds to detected irregularities on the article; means for causing the computer to establish a modified molding profile by applying at least one algorithm to the additional information; and means for causing the computer to output additional electronic signals to the molding machine causing the molding machine to mold an additional article, where the additional electronic signals are dependent on the modified molding profile. Because the computer readable program code causes the computer to establish a modified molding profile based on information which corresponds to detected irregularities on the molded article, it is no longer necessary to have the human operator manually set all the molding profile parameters on subsequent attempts to mold the article. Instead, it is only necessary to provide information to the computer which corresponds to detected irregularities on the article. As a consequence, it is not imperative that the human operator be extremely experienced in order to perfectly mold an article quickly. This is because one need not be highly experienced in order to accurately detect irregularities on a molded article.

A method for molding an article is also provided wherein computer readable program code as described above is provided to cause a computer to output electronic signals to a molding machine to mold an article without the need for a highly experienced human operator. Thus, difficulties encountered in the past are substantially eliminated by the present invention.

Other features and advantages of the present invention will become apparent from a review of the following description, drawings, and claims.

DETAILED DESCRIPTION OF THE INVENTION

Figure 1:
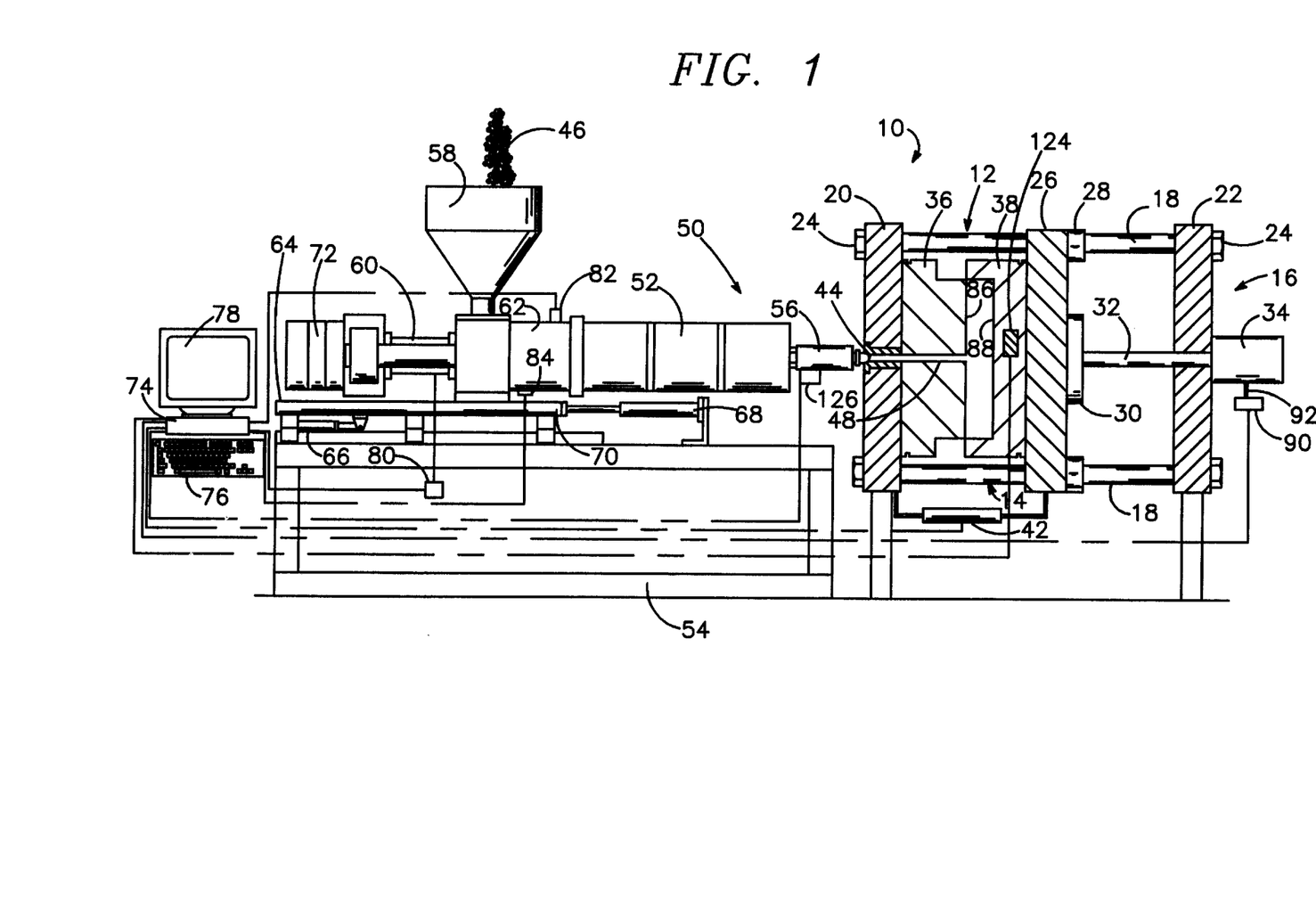
FIG. 1 is a side elevational view of a plastic injection molding machine connected to a computer where a mold unit of the molding machine is in an open position.

Referring to FIG. 1, there is shown a plastic injection molding machine 10 including a mold unit 12, a mold frame 14, and a hydraulic piston 16. The mold frame 14 consists of four cylindrical support bars 18 which are secured to a first plate 20 and a second plate 22 by means of nuts 24. A mold carriage 26 is slideably attached to the support bars 18. Support blocks 28 are mounted to the mold carriage 26 to add extra support to the mold carriage 26 as it slides along the support bars 18. A platen 30 is secured to the mold carriage 26 to evenly distribute force over the mold carriage 26. Secured to the platen 30 is a piston ram 32. The piston ram 32 centrally passes through the second plate 22, and the piston ram 32 is connected to, and is driven by, a hydraulic cylinder 34. A variable vane hydraulic pump 90 is connected to a traverse valve 92 which is connected to the hydraulic cylinder 34. The hydraulic cylinder 34, piston ram 32, traverse valve 92, and variable vane hydraulic pump 90 make up the hydraulic piston 16.

Figure 2:
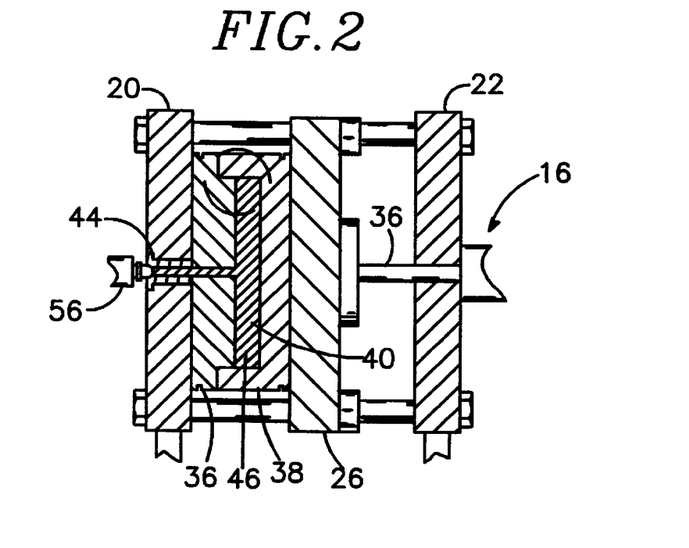
FIG. 2 is a side elevational view of the mold unit of FIG. 1 in a closed position.

A male mold section 36 is mounted to the first plate 20 in alignment with a female mold section 38 which is mounted to the mold carriage 26. As the hydraulic piston 16 pushes the mold carriage 26 toward the first plate 20, the male mold section 36 fits into seated engagement with the female mold section 38 to form a mold cavity 40 therebetween as shown in FIG. 2. As an option, obstructions (not shown) may be provided within the mold cavity 40. As shown in FIG. 1, a computer 74 is connected to the hydraulic piston 16 at the variable vane hydraulic pump 90. The computer 74 controls the operation of the hydraulic cylinder 34 by way of the computer 74 sending electronic signals to the variable vane hydraulic pump 90. Therefore, the computer 74 controls the forming of the mold cavity 40.

Figure 12:
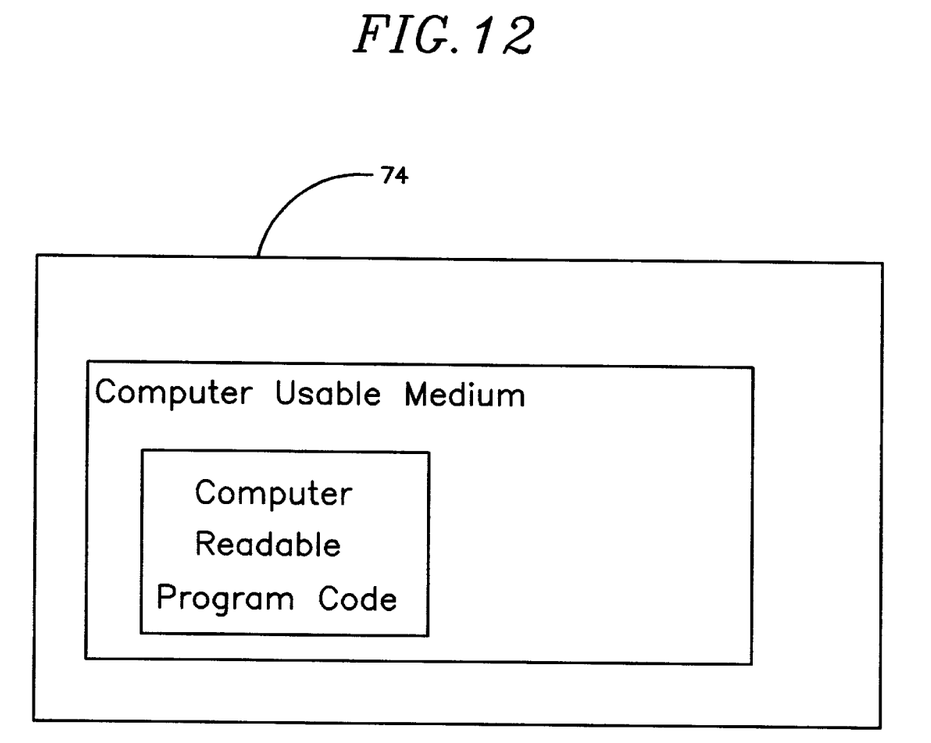
FIG. 12 is a schematic diagram illustrating one embodiment of the invention comprising a computer comprising a computer usable medium having computer readable program code embodied thereon.

In the preferred embodiment, the computer 74 is a personal computer, but the computer 74 may, of course, be any system capable of receiving information such as user input variables, monitoring the progress of a plastic injection run, and controlling the injection in response thereto. As shown in FIG. 12, it is computer readable program code which directs the computer 74 to perform the functions described herein. Preferably, the computer 74 is equipped with an input device 76 and a computer screen 78.

As shown in FIG. 1, a linear actuator 42 is mounted between both the first plate 20 and mold carriage 26 to monitor the distance therebetween. The linear actuator 42 is connected to the computer 74 in order to give feedback to the computer 74 as to the position of the male mold section 36 relative to the female mold section 38. It is appreciated that the linear actuator 42 could be located between the second plate 22 and the mold carriage 26, or between any two points which would give accurate feedback as to the position of the male mold section 36 relative to the female mold section 38.

As shown in FIG. 2, a nozzle inlet 44 is located in the center of the first plate 20 to allow a plastic material 46 to be injected into a gate 48 located in the male mold section 36 and thereafter into the mold cavity 40. It is, of course, possible to provide a mold unit 12 which has multiple gates. As shown in FIG. 1, provided for operable engagement with the nozzle inlet 44 is an injection assembly 50 which prepares and injects the plastic material 46 into the mold cavity 40. The injection assembly 50 is provided with an injection barrel 52 supported by a main frame 54. A nozzle 56 is mounted at one end of the injection barrel 52 and a hopper 58 is mounted on top of the injection barrel 52. Positioned coaxially within the injection barrel 52 is a reciprocating screw 60 with attached flights (not shown) for plasticizing and moving the plastic material 46 toward the injection barrel 52 and nozzle 56. A variable volume, pressure compensated hydraulic pump 62 is secured to the injection barrel 52 and operates to move the injection screw 60 relative to the injection barrel 52 during the injection molding process. The injection assembly 50 is provided with a large rotational motor 72 which turns the injection screw 60 to plasticize the plastic material 46 before injection.

The nozzle 56 is movable into and out of operative association with the nozzle inlet 44 upon a reciprocal movement of a carriage 64 relative to the main frame 54. This reciprocal movement is responsive to the operation of a double acting cylinder 66 pivotally interconnected between the carriage 64 and the main frame 54. The operation of the double acting cylinder 66 is controlled by a second linear actuator 68 mounted on the mainframe 54 for coacting engagement with a limit member 70 on the carriage 64.

The injection assembly 50 is operably coupled to the computer 74 which monitors the progress of the injection process. To monitor the rate of plastic material 46 injection, a shot size transducer 80 is coupled to both the injection screw 60 and the computer 74 so that the computer 74 can monitor the distance that the injection screw 60 travels. The shot size transducer 80 is a linear actuator which correlates movement of the injection screw 60 to a predetermined amount of the plastic material 46 injected into the mold cavity 40. As each incremental amount of plastic material 46 within the injection assembly 50 is injected into the mold cavity 40, the shot size transducer 80 monitors the associated incremental movement of the injection screw 60. Preferably the shot size transducer 80 measures increments of plastic material 46 of one gram or less, which translates into approximately four thousand increments for a typical molding operation.

To allow the computer 74 to monitor the pressure at which the plastic material 46 is injected into the mold cavity 40, a pressure monitor 82 is operably coupled to the hydraulic pump 62 and to the computer 74. The computer 74 is also operably coupled to an injection control 84 which is, in turn, coupled to the hydraulic pump 62 so that the computer 74 can manipulate the injection of the plastic material 46. Therefore, the computer 74 can monitor inject pressure by receiving information from the pressure monitor 82, and the computer 74 can manipulate the injection by sending an electronic signal to the injection control 84 which is connected to the hydraulic pump 62.

Figure 3:
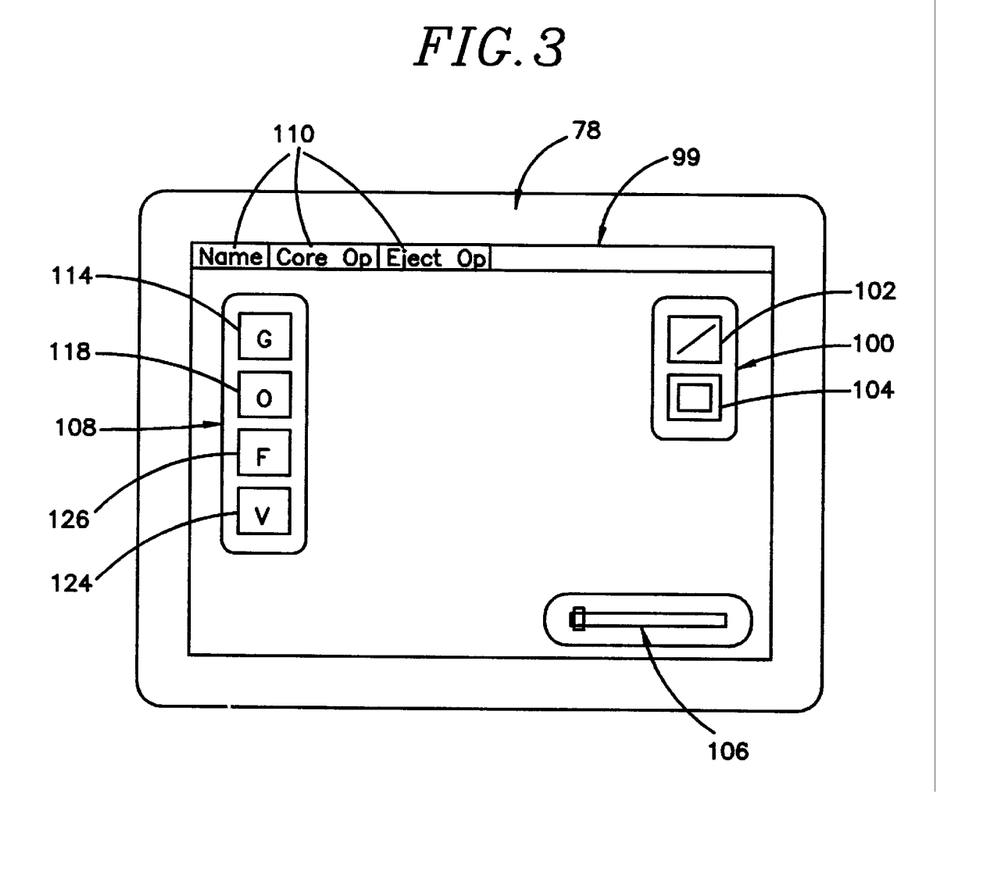
FIG. 3 is a view of a visual output of a computer screen while the computer of FIG. 1 is seeking information.
Figure 4:
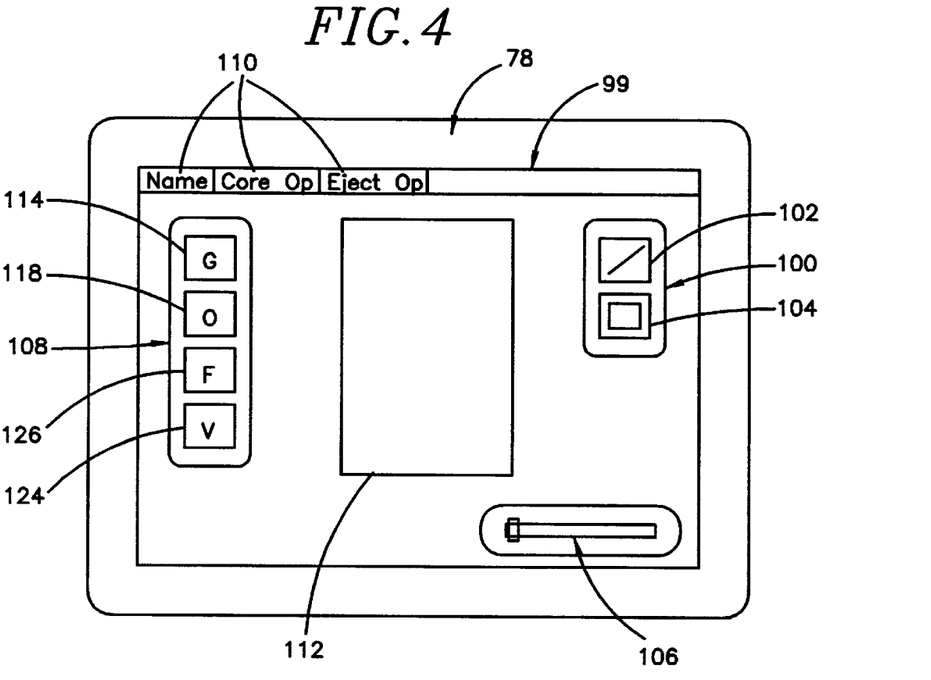
FIG. 4 is a view of a visual output of the computer screen after information as to the shape of a mold cavity is received by the computer.

To begin the molding process, computer readable program code causes the computer 74 to receive information. A representative visual output of the computer screen 78 while the computer 74 is waiting to receive this information is shown in FIG. 3. Such information may include the type of plastic material 46 which is going to be injected, the shape of the mold cavity 40, the location of gates within the mold cavity 40, the locations of any obstructions within the mold cavity 40, and the injection size of the plastic material 46 into the mold cavity 40. This information may be provided to the computer 74 by a human operator (not shown). As shown in FIG. 3, it is possible to provide a graphic user interface 99 which provides a first tool bar 100 so that the human operator can easily indicate the shape of the mold cavity 40 to the computer 74 by drawing the mold cavity 40 of FIG. 2 on the computer screen 78. As shown in FIG. 3, a line drawing tool 102 and a rectangle drawing tool 104 can be provided within the first tool bar 100. If, for example, the human operator chooses to use the line drawing tool 102 to draw the mold cavity 40, the human operator would merely use a computer input mouse (not shown) or a drawing pen (not shown) to draw lines on the computer screen 78 to indicate to the computer 74 the shape of the mold cavity 40. If, on the other hand, the human operator were to choose to use the rectangle drawing tool 104, the human operator would merely indicate the four corners of a rectangle on the computer screen 78 in order to indicate the shape of the mold cavity 40, and the computer 74 would display the rectangular shape effectively drawn by the human operator. As shown in FIG. 3, a shot size indicator 106, a second tool bar 108, and menu items 110 may be also provided. After the computer 74 receives information as to the shape of the mold cavity 40, the visual output of the computer screen 78 may look as shown in FIG. 4 where the computer screen 78 displays a mold cavity representation 112.

Figure 5:
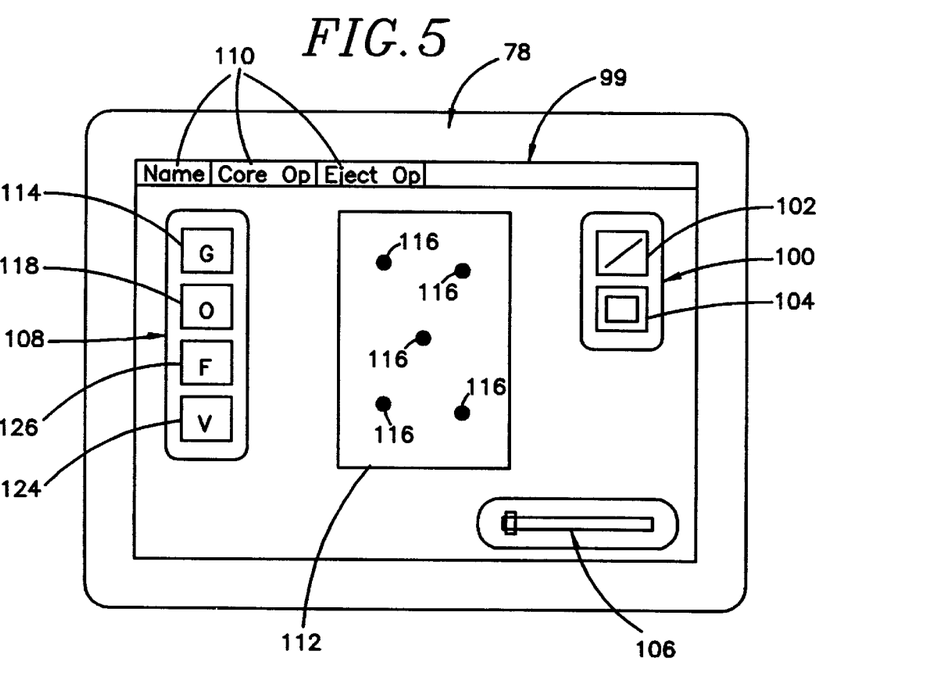
FIG. 5 is a view of a visual output of the computer screen after information as to the location of gates is received by the computer.

Next, computer readable program code may allow the human operator to choose a gate drawing tool 114 within the second tool bar 108 to indicate on the computer screen 78, and therefore to the computer 74, the locations of the gates 48 within the mold cavity 40. After the computer receives information regarding the locations of the gates 48, the visual output of the computer screen 78 may be as shown in FIG. 5 where the computer screen displays gate representations 116.

Figure 6:
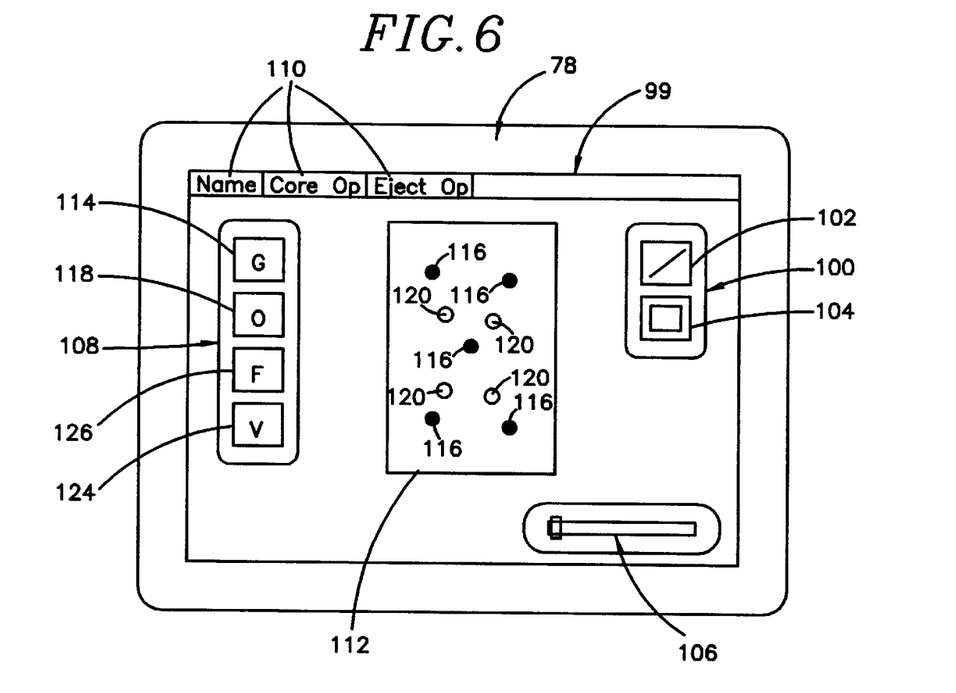
FIG. 6 is a view of a visual output of the computer screen after information as to the location of obstructions is received by the computer.

Next, computer readable program code may allow the human operator to choose an obstruction drawing tool 118 within the second tool bar 108 in order to indicate on the computer screen 78, and therefore to the computer 74, the locations of any obstructions within the mold cavity 40. After the computer receives information regarding the locations of any obstructions, the visual output of the computer screen 78 may be as shown in FIG. 6 where the computer screen 78 displays obstruction representations 120.

Figure 7:
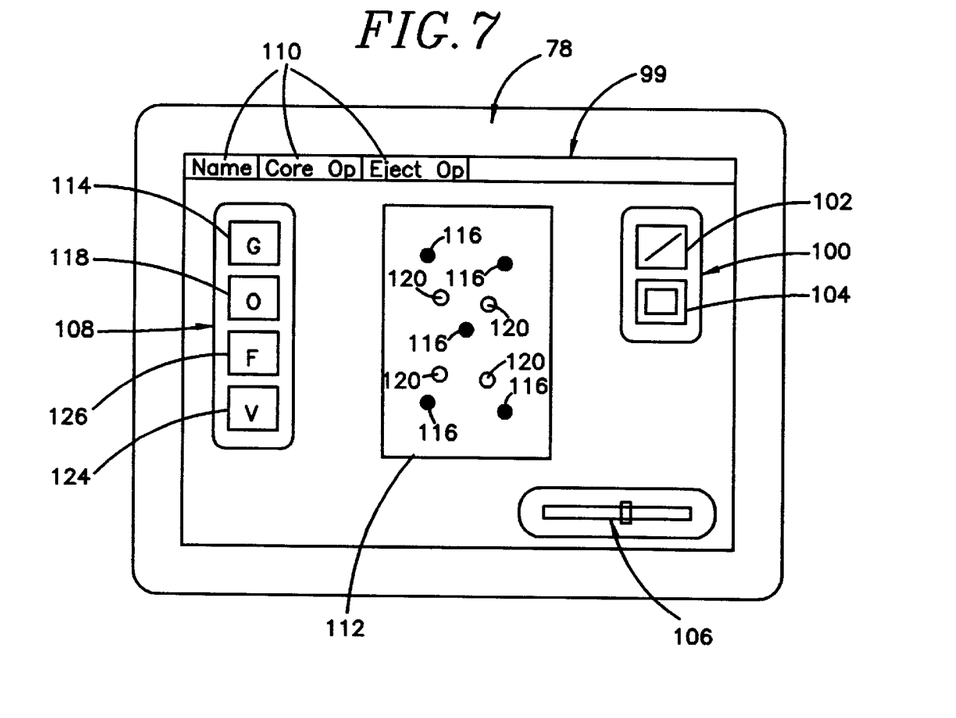
FIG. 7 is a view of a visual output of the computer screen after information as to the injection size is received by the computer.

Next, computer readable program code may allow the human operator to use the menu items 110 to pull up other input screens (not shown) so that more information may be given to the computer 74. For example, the menu items 110 may allow the human operator to ultimately input information relating to core operations if one or more cores are to be inserted into the mold cavity 40, or to ejector operations if appropriate. In addition, the menu items 110 may allow the human operator to retrieve information stored in the computer where the information relates to one or more molding profiles, perhaps organized in the computer's memory according to the name of the plastic article desired to be molded. Moreover, computer readable program code may allow the human operator to specify the amount of material 46 to be injected into the mold cavity 40 by setting the shot size indicator 106 on the computer screen 78. After receiving all the necessary information, the visual output of the computer screen 78 may look as shown in FIG. 7 where the shot size indicator 106 has been set.

Figure 8:
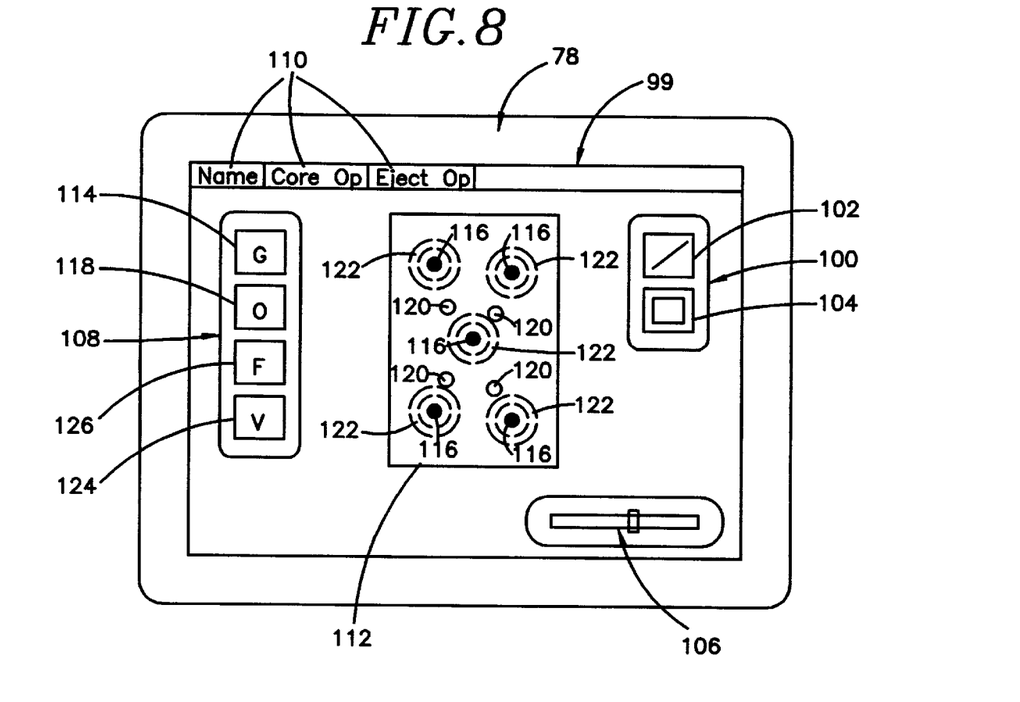
FIG. 8 is a view of a visual output of the computer screen while the molding machine of FIG. 1 is molding an article.

Next, computer readable program code causes the computer 74 to establish a molding profile based on the information received. Then, computer readable program code causes the computer 74 to output electronic signals to the different components of the molding machine 10 which are connected to the computer 74 (discussed hereinabove) in order to mold an article, where the electronic signals are dependent on the molding profile. When the molding machine 10 is molding the article, the visual output of the computer screen 78 may be as shown in FIG. 8 where the computer screen 78 displays plastic material representations 122.

In molding the article, the computer 74 signals the hydraulic pump 90 in order to actuate the hydraulic piston 16 forcing the piston ram 32 toward the first plate 20. The platen 30 disburses the force of the piston ram 32 to the mold carriage 26 and the female mold section 38. The female mold section 38 is moved toward the male mold section 36 until a mold cavity 40 is formed.

Thereafter, the computer causes a plastic material 46 to heat to an injection temperature and be injected into the molding cavity 40. However, before the plastic material 46 is injected into the mold cavity 40, it is first plasticized to provide a flowable material. The following parameters affect the plasticization process: the type of raw plastic material 46 to be plasticized, the throat temperature, the temperature of injection assembly heating zones, the size, length and type of screw 60, the rate at which the screw 60 is turned, and the rate at which the screw 60 is allowed to move back. Of these parameters, only the type of raw plastic material 46 and the dimensions of the screw 60 are not directly controlled by the computer 74. The throat temperature and temperature of injection assembly heating zones are controlled by standard proportion integral derivative (PID) control algorithms. The computer 74 controls the rate at which the screw 60 is turned so that the rate is directly proportional to the rate of oil produced by the variable vane hydraulic pump 90. The computer 74 directly controls the rate at which the oil is delivered by the hydraulic pump 62 by supplying two set points, a rate set point and a maximum pressure set point. The rate set point specifies the rate of oil flow requested while the maximum pressure set point specifies a maximum pressure limit. Consequently, since pressure is a function of rate of flow times a resistance, the maximum pressure set point will limit the rate of flow in the case when maximum pressure is obtained. Preferably, the rate at which the screw 60 turns during the plasticization process is profiled. Profiling causes the screw 60 to turn at different rates during the plasticization cycle.

The rate at which the screw 60 is allowed to move back is also controlled by the computer 74. The profiled turning of the screw 60 during the plasticization process causes the plastic material 46 to be metered to an area in front of the screw 60. The plastic material 46 being metered forward causes a counter plastic pressure attempting to force the screw 60 backward. The rate at which the screw 60 moves backward, from the counter pressure of the plastic material 46 being metered forward, is profiled by the computer 74. Profiling of the rate of movement backward allows for variations in the amount of time the plastic material 46 is mixed by the screw 60, as well as profiling the amount of frictional heat created by the screw 60 turning which is induced into the plastic material 46. The computer 74 specifies this profile by supplying a back pressure set point to a variable hydraulic back pressure valve (not shown).

Like the plasticization process, the injection process is also controlled by the computer 74. The parameters associated with the injection process include the following: the type of raw plastic material 46 to be injected; the temperature of the plastic material 46; the size, length and type of screw 60; the rate at which the plastic material 46 is injected; the design of the mold cavity 40; and the mold cavity 40 temperature.

To control the temperature of plastic material 46 as the material 46 enters the mold cavity 40 during injection (injection temperature), the computer 74 controls several parameters. In a preferred embodiment, the computer 74 receives feedback as to the injection temperature from a temperature sensor 126 near the nozzle inlet 44. The heater bin temperature is manipulated during the plasticization process and frictional heat is controlled during both the plasticization and back pressure cycles. Additionally, frictional heat developed from the plastic material 46 moving through the injection nozzle 56 during the injection process is controlled to provide the optimum amount of heat into the material 46 based upon the desired resulting plastic article.

The computer 74 allows the rate at which the plastic material 46 is injected during the inject cycle to be profiled. Profiling causes the injection material 46 to be injected at different rates during the inject cycle. The computer 74 specifies this profile by supplying the required rate and maximum pressure set points to the variable vane pump 90 supplying a profiled oil flow to the cylinders attached to the screw 60. A typical inject profile will begin at a slow inject rate with the pump set to allow for maximum pressure. As the mold cavity 40 fills, the rate proportionally increases to the optimum rate for the filling of the mold cavity 40. When the mold cavity 40 is approximately ninety percent (90%) filled, the maximum pressure set point of the hydraulic pump 62 is lowered to a value which prevents the injection pressure from overcoming the clamp pressure. The remainder of the material is injected into the mold cavity 40 allowing the pressure compensation characteristics of the pump 62 to control the rate at which the material 46 is injected.

During the injection process, the pressure is maintained by the hydraulic pump 62, and the air pressure in the mold cavity 40 provides back pressure during the filling of the mold cavity 40. After the plastic material 46 is in the mold cavity 40, the hydraulic piston 16 applies a clamping pressure which tends to urge the female mold section 38 towards the male mold section 36.

The computer 74 sends a signal to the variable vane hydraulic pump 90. The variable vane hydraulic pump 90 controls the flow of oil to the hydraulic cylinder 34 through the traverse valve 92. The linear actuator 42 gives the computer 74 feedback as to the position of the female mold section 38. By controlling the flow of oil to the hydraulic cylinder 34 in response to the location of the female mold section 38, the computer 74 is able to control the position of the female mold section 38, and the rate at which it moves.

The plastic material 46 is allowed to cool and harden into a plastic article, and after the plastic article has sufficiently cooled and hardened, it is removed from the mold cavity 40. A post-molding cooling apparatus (not shown) can be utilized to speed-up production by cooling the article as soon as it can be ejected from the mold cavity 40. Thereafter, the molded article is examined for irregularities such as "voids" (locations on the molded article where the injected plastic material 46 never reached) and "flashes" (locations on the molded article where injected plastic material 46 seeped out of the mold cavity 40 because the mold sections 36 and 38 of the mold unit 12 moved slightly away from each other during molding).

Figure 9:
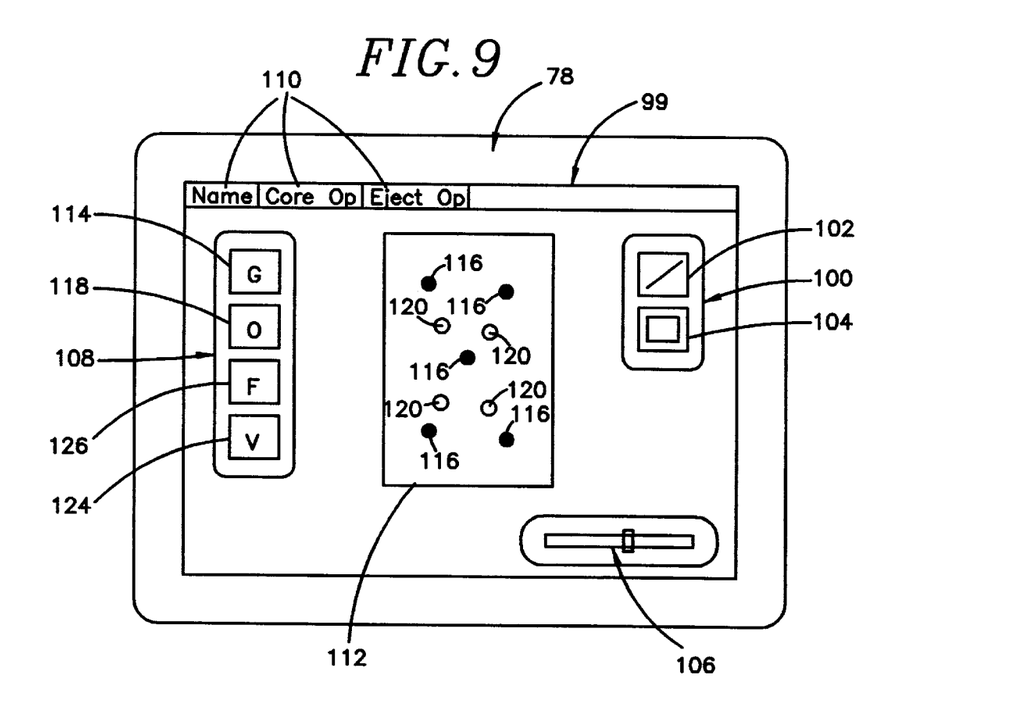
FIG. 9 is a view of a visual output of the computer screen while the computer is seeking additional information corresponding to detected irregularities on the article molded by the molding machine of FIG. 1.
Figure 10:
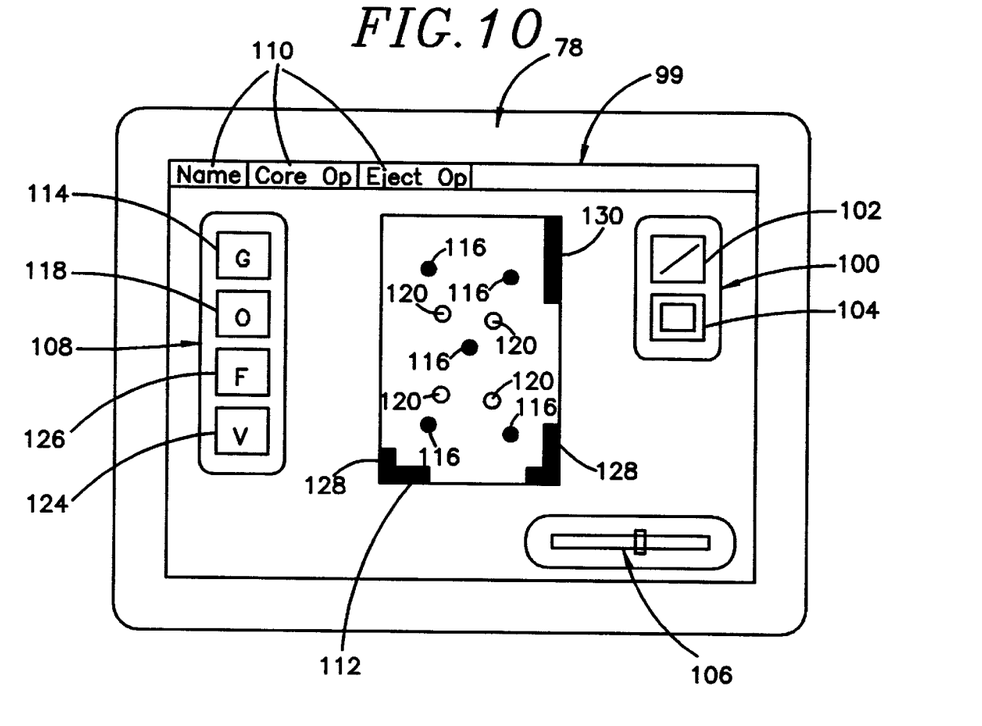
FIG. 10 is a view of a visual output of the computer screen after the computer has received the additional information.
Figure 11:
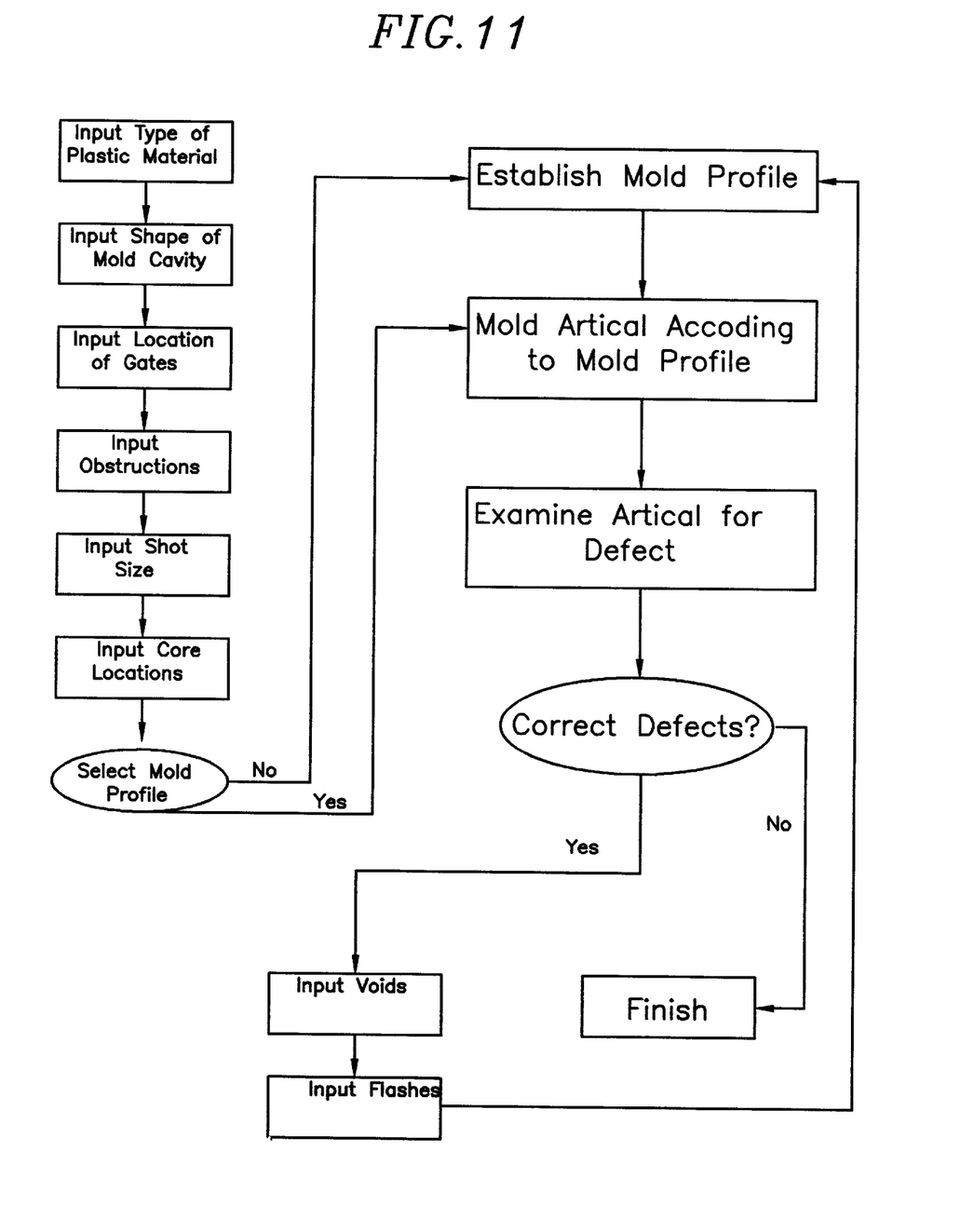
FIG. 11 is a flow chart illustrating one embodiment of the computer readable program code.

Then, computer readable program code causes the computer 74 to wait to receive additional information where the additional information corresponds to detected irregularities on the molded article. At this time, the visual output of the computer screen 78 may look as shown in FIG. 9. Computer readable program code may allow the human operator to use a void drawing tool 124 located within the second tool bar 108 to draw "void" representations 128 on the computer screen 78 as shown in FIG. 10 in order to inform the computer 74 of locations of detected voids on the actual molded article. Also, computer readable program code may allow the human operator to use a flash drawing tool 126 within the second tool bar 108 to draw "flash" representations 130 on the computer screen 78 as shown in FIG. 10 in order to inform the computer 74 of locations of detected flashes on the actual molded article. If the computer 74 determines from the additional information that there are no irregularities on the molded article, the molding of the article is complete, and the injection molding process may be repeated. However, if the computer 74 determines from the additional information that there are irregularities on the molded article, computer readable program code causes the computer 74 to establish a modified molding profile by applying at least one algorithm to the additional information. The modified molding profile may include the following: a plasticization profile, a backpressure profile, an injection profile, a temperature profile, and a valve gating profile.

Next, computer readable program code causes the computer 74 to output additional electronic signals to the different components of the molding machine 10 which are connected to the computer 74 (discussed hereinabove) in order to mold an additional article, where the additional electronic signals are dependent on the modified molding profile established by the computer 74. When the molding machine 10 is molding the article, the visual output of the computer screen 78 may be as shown in FIG. 8 where the computer screen 78 displays plastic material representations 122. Thereafter, the molded article is removed from the mold unit 12 and examined for irregularities. Computer readable program code causes the computer 74 to receive additional information as described above, and the process is repeated until the computer 74 determines from the additional information that there are no irregularities on the molded article.

The foregoing description and drawings merely explain and illustrate the invention, and the invention is not limited thereto, except insofar as the claims are so limited as those skilled in the art who have the disclosure before them will be able to make modifications and variations therein without departing from the scope of the invention. For example, it is anticipated that the molding machine 10 may vary considerably from that which is disclosed herein, it is anticipated that information provided to the computer 74 may not be identical that described herein and may not be provided by a human operator, and it is anticipated that visual outputs of the computer screen 78 may vary from those which are disclosed herein.

What is claimed is:

1. An article of manufacture comprising means for causing a molding machine to mold an article, said means for causing a molding machine to mold an article comprising:
   a) a computer,
   b) means for receiving information;
   c) means for establishing a molding profile based on said information;
   d) means for operating said molding machine based on said molding profile, said molding machine thereby molding said article;
   e) computer readable program code means for causing the computer to receive additional information through a graphic user interface, said additional information corresponding to detected irregularities on said article molded by said molding machine;
   f) means for establishing a modified molding profile based on said additional information; and
   g) means for operating said molding machine based on said modified molding profile, said molding machine thereby molding an additional article.

2. The article of manufacture according to claim 1, wherein said means for receiving information comprises:
   (a) said computer; and
   (b) means for causing said computer to receive said information.

3. The article of manufacture according to claim 2, wherein said means for causing said computer to receive said information comprises computer readable program code.

4. The article of manufacture according to claim 1, wherein said means for establishing a molding profile comprises means for applying at least one algorithm to said information.

5. The article of manufacture according to claim 1, wherein said means for operating said molding machine based on said molding profile comprises said computer connected to said molding machine, said computer in communication with said molding machine.

6. The article of manufacture according to claim 1, wherein said means for establishing a modified molding profile comprises means for applying at least one algorithm to said additional information.

7. The article of manufacture according to claim 1, wherein said means for operating said molding machine based on said modified molding profile comprises said computer connected to said molding machine, said computer in communication with said molding machine.

8. The article of manufacture according to claim 1, further comprising a computer usable medium.

9. The article of manufacture according to claim 8, wherein said computer usable medium comprises a floppy disc.

10. The article of manufacture according to claim 8, wherein said computer usable medium comprises a CD-ROM.

11. The article of manufacture according to claim 1, wherein said means for receiving information comprises means for receiving said information from a human through a graphic user interface.

12. An article of manufacture comprising a computer usable medium having computer readable program code means embodied therein for causing a computer to output electronic signals to a molding machine causing said molding machine to mold an article, said computer readable program code means in said article of manufacture comprising:
   a) computer readable program code means for causing the computer to receive information;
   b) computer readable program code means for causing the computer to establish a molding profile based on said information;
   c) computer readable program code means for causing the computer to output electronic signals to said molding machine causing said molding machine to mold said article, said electronic signals dependent on said molding profile;
   d) computer readable program code means for causing the computer to receive additional information through a graphic user interface, said additional information corresponding to detected irregularities on said article molded by said molding machine;
   e) computer readable program code means for causing the computer to establish a modified molding profile based on said additional information; and
   f) computer readable program code means for causing the computer to output additional electronic signals to said molding machine causing said molding machine to mold an additional article, said additional electronic signals dependent on said modified molding profile.

13. The article of manufacture according to claim 12, wherein said computer usable medium is a floppy disk.

14. The article of manufacture according to claim 12, wherein said computer usable medium is a CD-ROM.

15. The article of manufacture according to claim 12, further comprising computer readable program code means for enabling a user to communicate said information to said computer through a graphic user interface.

16. The article of manufacture according to claim 12, wherein said article and said additional article are comprised of plastic.

17. The article of manufacture according to claim 12, wherein said means for establishing a modified molding profile comprises means for applying an algorithm to said additional information.

18. The article of manufacture according to claim 12, wherein said computer readable program code means for causing said computer to receive information comprises means for causing said computer to receive said information from a human through a graphic user interface.

19. A method of operating a molding machine, said method comprising:
   a) providing a computer, said computer communicatingly connected to said molding machine,
   b) receiving information;
   c) establishing a molding profile based on said information;
   d) operating said molding machine based on said molding profile, said molding machine thereby molding said article;
   e) providing computer readable program means for causing the computer to receive additional information through a graphic user interface, said additional information corresponding to detected irregularities on said article molded by said molding machine;
   f) establishing a modified molding profile based on said additional information; and
   g) operating said molding machine based on said modified molding profile, said molding machine thereby molding an additional article.

20. The method according to claim 19, wherein said step of receiving information comprises:

(a) providing a computer; and (b) causing said computer to receive said information.

21. The method according to claim 20, wherein said step of causing said computer to receive said information comprises providing computer readable program code.

22. The method according to claim 19, wherein said step of establishing a molding profile comprises applying at least one algorithm to said information.

23. The method according to claim 19, wherein said step of operating said molding machine based on said molding profile comprises providing a computer connected to said molding machine, said computer in communication with said molding machine.

24. The method according to claim 19, wherein said step of establishing a modified molding profile comprises applying at least one algorithm to said additional information.

25. The method according to claim 19, wherein said step of operating said molding machine based on said modified molding profile comprises providing a computer connected to said molding machine, said computer in communication with said molding machine.

26. The method according to claim 25, wherein said computer usable medium comprises a floppy disc.

27. The method according to claim 25, wherein said computer usable medium comprises a CD-ROM.

28. The method according to claim 19, further comprising providing a computer usable medium.

29. The method according to claim 19, wherein said step of receiving information comprises receiving said information from a human through a graphic user interface.

30. A method of molding an article comprising:

a) providing a molding machine, said molding machine having a mold unit, said mold unit having a male mold section and a female mold section which on being brought together form a mold cavity;

b) providing a computer, said computer communicatingly connected to said molding machine;

c) providing computer readable program code means for causing the computer to receive information;

d) providing computer readable program code means for causing the computer to output electronic signals to said molding machine causing said male mold section and said female mold section to come together to form said mold cavity, and causing a plastic material to be injected into said mold cavity to form an article, said electronic signals dependent on said information;

f) removing said article from said mold unit;

g) detecting irregularities on said article;

h) providing computer readable program code means for causing the computer to receive additional information through a graphic user interface, said additional information corresponding to said irregularities on said article;

i) providing computer readable program code means for causing the computer to establish a modified molding profile by applying at least one algorithm to said additional information;

j) providing computer readable program code means for causing the computer to output additional electronic signals to said molding machine causing said male mold section and said female mold section to come together to form said mold cavity, and causing a plastic material to be injected into said mold cavity to form an additional article, said additional electronic signals dependent on said modified molding profile; and k) removing said additional article from said mold unit.

31. The method according to claim 30, further comprising:

a) providing a graphic user interface, said graphic user interface in communication with said computer; and b) communicating said information to the computer through the graphic user interface.

* * * * *